US011663279B2

(12) United States Patent
Chow et al.

(10) Patent No.: US 11,663,279 B2
(45) Date of Patent: May 30, 2023

(54) FILTER LIST GENERATION SYSTEM

(71) Applicant: Capital One Services, LLC, McLean, VA (US)

(72) Inventors: Chih-Hsiang Chow, Plano, TX (US); Elizabeth Furlan, Plano, TX (US); Steven Dang, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/308,464

(22) Filed: May 5, 2021

(65) Prior Publication Data

US 2022/0358173 A1 Nov. 10, 2022

(51) Int. Cl.
*G06F 3/0482* (2013.01)
*G06F 16/9535* (2019.01)
*G06F 40/284* (2020.01)
*G06F 40/30* (2020.01)
*G06F 3/0485* (2022.01)

(52) U.S. Cl.
CPC ........ *G06F 16/9535* (2019.01); *G06F 3/0482* (2013.01); *G06F 3/0485* (2013.01); *G06F 40/284* (2020.01); *G06F 40/30* (2020.01)

(58) Field of Classification Search
CPC .. G06F 16/9535; G06F 3/0482; G06F 3/0485; G06F 40/284; G06F 40/30
See application file for complete search history.

(56) References Cited

U.S. PATENT DOCUMENTS

| | | | |
|---|---|---|---|
| 6,011,555 A * | 1/2000 | Eckhoff | G06F 3/0482 715/843 |
| 7,233,937 B2 | 6/2007 | Subramaniam et al. | |
| 7,792,821 B2 | 9/2010 | Shakib et al. | |
| 8,868,574 B2 | 10/2014 | Kiang et al. | |
| 9,111,007 B2 * | 8/2015 | Carounanidy | G06F 16/9577 |
| 9,244,595 B2 * | 1/2016 | Garrison | G06F 3/0482 |
| 9,575,941 B1 * | 2/2017 | Westbrook | G06F 16/9577 |
| 9,952,750 B2 * | 4/2018 | Bertram | G06F 9/44 |
| 10,198,514 B1 * | 2/2019 | Krotkov | G06F 16/9535 |
| 10,198,524 B1 * | 2/2019 | Amalapurapu | G06F 16/958 |

(Continued)

OTHER PUBLICATIONS

Load and execution sequence of a web page?, retrieved from—https://stackoverflow.com/questions/1795438/load-and-execution-sequence-of-a-web-page, Nov. 25, 2009, 10 pages (Year: 2019).*

(Continued)

*Primary Examiner* — Yongjia Pan
(74) *Attorney, Agent, or Firm* — Banner & Witcoff, Ltd.

(57) ABSTRACT

Aspects described herein may allow for generating a filter list to facilitate users to refine their online search. Data items displayed on a web page may be determined based on the user's input data, for example, based on a selection command selecting the data items. Each data item corresponds to a feature of a product. Filters corresponding to the data items may be determined and the weight of each filter may be updated. A filter list may be generated and displayed to facilitate the user to refine his search for a class of products. The filters on the filter list may be automatically ordered based on the weight of each filter. In this way, a user may be able to find filters that are associated with features that he cares about the most and therefore use the filter list to obtain more satisfying results.

19 Claims, 7 Drawing Sheets

(56) References Cited

U.S. PATENT DOCUMENTS

| | | | |
|---|---|---|---|
| 10,410,122 B2 | 9/2019 | Cohen et al. | |
| 10,803,507 B1* | 10/2020 | Verma | G06F 3/04847 |
| 2008/0270250 A1 | 10/2008 | Bolivar et al. | |
| 2009/0287728 A1* | 11/2009 | Martine | G06Q 30/02 |
| | | | 715/810 |
| 2010/0076960 A1* | 3/2010 | Sarkissian | G06F 16/9535 |
| | | | 707/E17.109 |
| 2010/0293234 A1* | 11/2010 | Schmidt | G06Q 30/0603 |
| | | | 715/764 |
| 2010/0293494 A1* | 11/2010 | Schmidt | G06Q 30/02 |
| | | | 707/E17.02 |
| 2012/0197755 A1* | 8/2012 | Felder | G06Q 30/0643 |
| | | | 705/26.8 |
| 2012/0246156 A1 | 9/2012 | Gupta et al. | |
| 2013/0124449 A1 | 5/2013 | Pinckney et al. | |
| 2013/0339886 A1* | 12/2013 | Batham | G06Q 30/0641 |
| | | | 715/765 |
| 2015/0095768 A1* | 4/2015 | Rimmer | G06F 40/103 |
| | | | 715/238 |
| 2016/0012135 A1* | 1/2016 | Wang | G06F 16/9535 |
| | | | 707/731 |
| 2018/0095604 A1* | 4/2018 | Nguyen | G06F 40/186 |
| 2019/0073091 A1* | 3/2019 | Chisholm | G09G 5/14 |
| 2019/0122266 A1 | 4/2019 | Ramer et al. | |
| 2019/0197598 A1* | 6/2019 | Guo | G06Q 30/0631 |
| 2019/0318407 A1* | 10/2019 | Giridhari | G06Q 30/0627 |

OTHER PUBLICATIONS

What are good initial weights in a neural network?, retrieved from—https://stats.stackexchange.com/questions/47590/what-are-good-initial-weights-in-a-neural-network/186351 #186351, Jan. 12, 2013, 8 pages (Year: 2013).*

JavaScript HTML DOM printed Apr. 28, 2021 (8 pages)—https://www.w3schools.com/js/js_htmldom.asp.

* cited by examiner

| User ID 605 | Class of Product 610 | Filter 615 | Values of the Filter 620 | Weight 625 |
|---|---|---|---|---|
| ABC | Car | | | |
| | | Exterior Color | Black Red Blue ... | 4 |
| 630 | 635 | 640 | 645 | 650 |
| | | Interior Color | Silver Brown ... | 1 |
| | | 655 | 660 | 665 |
| | | Maximum Seats | Less Than 5 Between 5-7 More Than 7 ... | 3 |
| | | 670 | 675 | 680 |

FILTER LIST GENERATION SYSTEM

FIELD OF USE

Aspects of the disclosure relate generally to data processing, and hardware and software related thereto. More specifically, aspects of the disclosure may provide systems and methods for generating and displaying user interfaces for online search.

BACKGROUND

Online shopping websites, for example, websites that trade new and/or used cars, may provide search filters on a web page to help the users to refine their search results. By using the search filters, a user may be able to eliminate search results that do not have a feature he is interested in. For example, a "color of the car" filter may help users to limit their search results to contain only cars that have a desirable color. However, since different users may care about different features, the website may need to provide a lot of different filters for a certain type of product. Sometimes, a user may not be familiar with the location of each filter on the web page and therefore may not be able to utilize the filter even if a desirable filter is provided. Other times, a user may need to scroll down through the web browser in order to find the filter he wants to use. Not being able to utilize desirable filters conveniently may lead to less accurate search results and therefore reducing the user's satisfaction with the website.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may provide a computer-implemented method for generating a filter list and displaying it on a graphical user interface in order to facilitate the user to refine his online search. For example, in at least one embodiment, a web page being viewed in a web browser may be obtained. The web browser may display a portion of the web page. At least one data item in the displayed portion of the web page may be determined. Each of the at least one data item corresponds to a feature of a product. At least one filter corresponding to the displayed at least one data item may be determined. The at least one filter may comprise a plurality of values associated with the corresponding data item and a weight. A filter list for a class associated with the product may be generated. The filter list may comprise the at least one filter. The filter list may be used to refine the search for a class of product, e.g., cars. The at least one filter on the filter list may be automatically ordered based on the weight of each filter. A graphical user interface comprising the filter list and a search page may be generated. The search page may comprise a plurality of search results corresponding to the class associated with the product. The search results may be determined based on at least one filter on the filter list. The graphical user interface may be displayed using the web browser.

In yet another embodiment, the method may further comprise obtaining input data indicating a selected data item displayed in the web page, and updating the weight of the filter associated with the selected data item indicated in the input data.

In yet another embodiment, the computer-implemented method may further comprise obtaining input data to scroll through the web page, displaying a second portion of the web page using the web browser, identifying at least one second data item in the second portion of the web page displayed using the web browser, determining at least one additional filter based on the input data, updating the weight of the at least one additional filter based on the input data and the display of the at least one second data item within the second portion of the web page, and generating a second filter list to include at least one additional filter corresponding to the at least one second data item.

In yet another embodiment, the computer-implemented method may further comprise determining a filter in the at least one filter by identifying a token in the displayed portion of the web page, wherein the token comprises a semantic tag, determining the token corresponding to a data item for a feature of the product, and selecting a filter corresponding to the data item associated with the token in the displayed portion of the web page.

In yet another embodiment, the computer-implemented method may further comprise determining display characteristics of a computing device executing the web browser, determining a filter area and a content area of the graphical user interface based on the display characteristics, formatting the display of the filter list within the graphical user interface based on the filter area, and formatting the display of the search page within the graphical user interface based on the content area.

In yet another embodiment, the computer-implemented method may further comprise selecting a portion of the at least one filter on the filter list to be displayed in the filter area based on the weight associated with each of the filters on the filter list.

In yet another embodiment, the computer-implemented method may further comprise storing an indication of the at least one filter using a user profile, obtaining a second web page comprising information related to the class associated with the product, determining a second set of data items displayed in the second web page, generating a second set of filters based on the second set of data items, updating the weights of the filters in the second set of filters, generating a second filter list based on the updated weights of the filters in the second set of filters, generating a second graphical user interface comprising the second filter list and a second search page comprising a plurality of search results corresponding to the class associated with the product, and displaying the second graphical user interface using the web browser.

In yet another embodiment, the computer-implemented method may further comprise obtaining, for each data item, a default weight associated with the data item, the default weight generated based on a cohort of users that have viewed the web page, and updating the weight for each filter associated with each data item based on the default weight for the data item.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, techniques, apparatuses, and non-transitory computer-readable media for generating filter lists to facilitate users to refine their online search.

Figure 1:
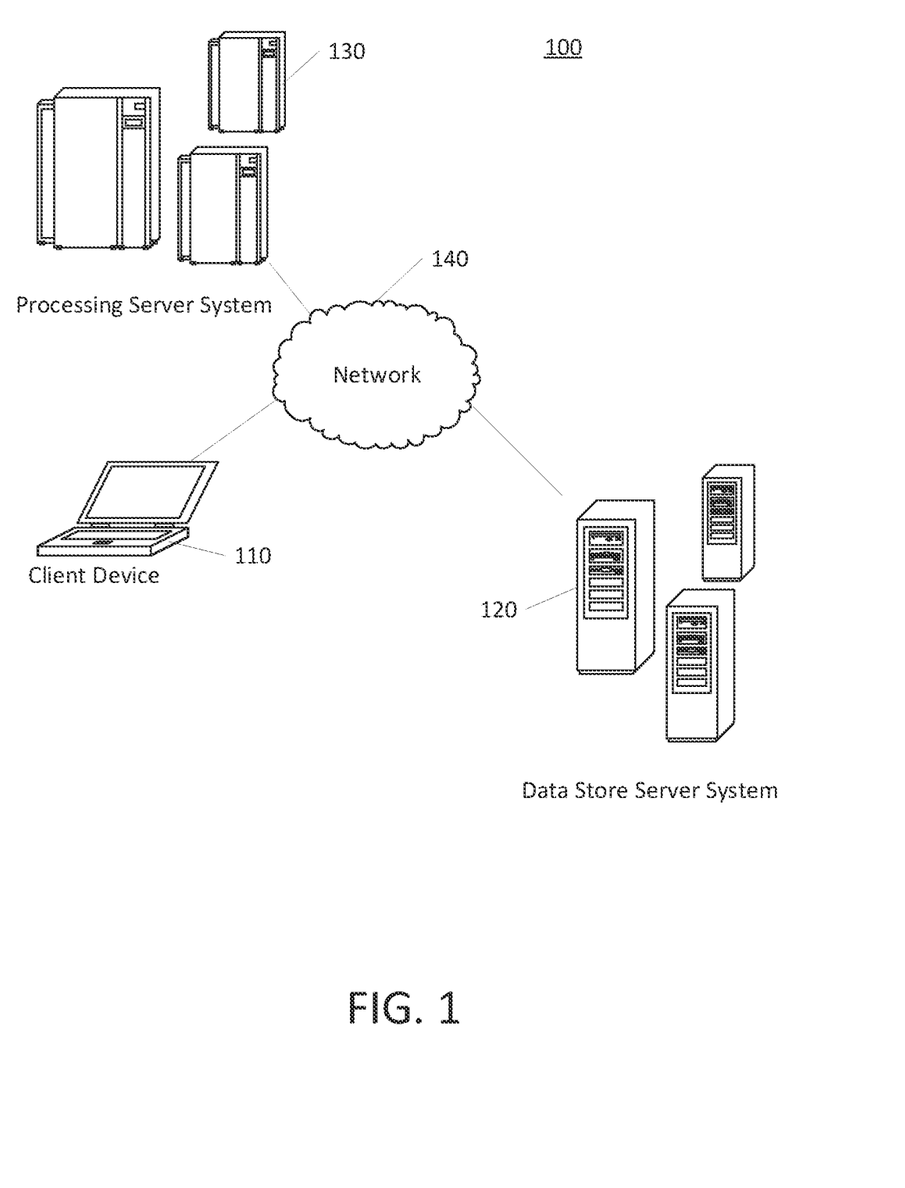
FIG. 1 depicts an example of a filter list generating system in which one or more aspects described herein may be implemented.

FIG. 1 shows an operating environment 100. The operating environment 100 may include at least one client device 110, at least one processing server system 130, and/or at least one data store server system 120 in communication via a network 140. It will be appreciated that the network connections shown are illustrative and any means of establishing a communications link between the computers may be used. The existence of any of various network protocols such as Transmission Control Protocol/Internet Protocol (TCP/IP), Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client devices 110 may display web pages and/or graphical user interfaces, and/or interact with users' input data as described herein. Data store server systems 120 may store a variety of data, such as user profiles that comprise information regarding filters and/or filter lists as described herein. Processing server systems 130 may exchange data with client devices 110, generate and/or update filter lists, generate web pages and/or graphical user interfaces as described herein. However, it should be noted that any computing device in the operating environment 100 may perform any of the processes and/or store any data as described herein. The processing server systems 130 and/or data store server systems 120 may be publicly accessible and/or have restricted access. Access to a particular server system may be limited to particular client devices 110. Some or all of the data described herein may be stored using one or more data stores. Data stores may include, but are not limited to relational databases, hierarchical databases, distributed databases, in-memory databases, flat file databases, Extensible Markup Language (XML) databases, structured Query Language (SQL) databases, graph databases, and/or a combination thereof. Any file system may be used to store data using a database and/or flat file as appropriate. The network 140 may include a local area network (LAN), a wide area network (WAN), a wireless telecommunications network, and/or any other communication network or combination thereof.

The data transferred to and from various computing devices in operating environment 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WebSocket Security (WS-S) standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

Figure 2:
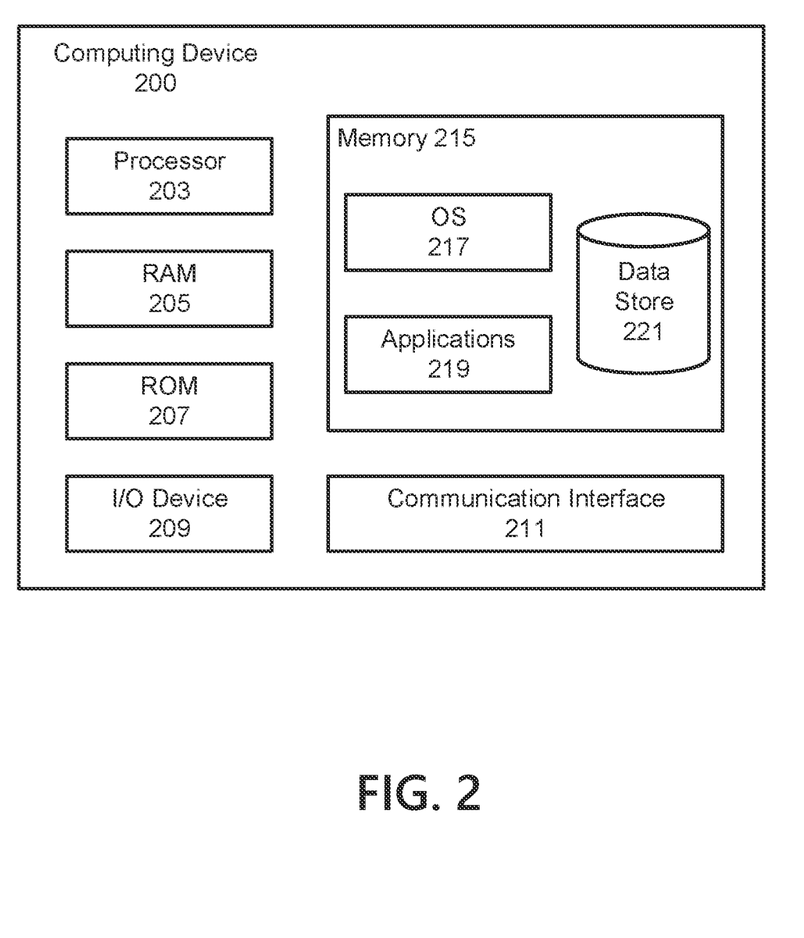
FIG. 2 depicts an example computing device in accordance with one or more aspects described herein.

Turning now to FIG. 2, a conceptual illustration of a computing device 200 that can be used to perform any of the techniques as described herein is shown. The computing device 200 can include a processor 203 for controlling an overall operation of the computing device 200 and its associated components, including RAM 205, ROM 207, input/output device 209, communication interface 211, and/or memory 215. A data bus can interconnect processor(s)

203, RAM 205, ROM 207, memory 215, I/O device 209, and/or communication interface 211. In some embodiments, computing device 200 can represent, be incorporated in, and/or include various devices such as a desktop computer, a computer server, a mobile device, such as a laptop computer, a tablet computer, a smartphone, any other types of mobile computing devices, and the like, and/or any other type of data processing device.

Input/output (I/O) device 209 can include a microphone, keypad, touch screen, and/or stylus through which a user of the computing device 200 can provide input, and can also include one or more of a speaker for providing audio output and a video display device for providing textual, audiovisual, and/or graphical output. Software can be stored within memory 215 to provide instructions to processor 203 allowing computing device 200 to perform various actions. Memory 215 can store software used by the computing device 200, such as an operating system 217, application programs 219, and/or one or more data stores 221. The various hardware memory units in memory 215 can include volatile and nonvolatile, removable and non-removable media implemented in any method or technology for storage of information such as computer-readable instructions, data structures, program modules, or other data. Memory 215 can include one or more physical persistent memory devices and/or one or more non-persistent memory devices. Memory 215 can include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that can be used to store the desired information and that can be accessed by processor 203.

Communication interface 211 can include one or more transceivers, digital signal processors, and/or additional circuitry and software for communicating via any network, wired or wireless, using any protocol as described herein. It will be appreciated that the network connections shown are illustrative and any means of establishing a communications link between the computers can be used. The existence of any of various network protocols such as TCP/IP, Ethernet, FTP, Hypertext Transfer Protocol (HTTP) and the like, and various wireless communication technologies such as Global system for Mobile Communication (GSM), Code-division multiple access (CDMA), WiFi, and Long-Term Evolution (LTE), is presumed, and the various computing devices described herein can be configured to communicate using any of these network protocols or technologies.

Processor 203 can include a single central processing unit (CPU) (and/or graphic processing unit (GPU)), which can include a single-core or multi-core processor along with multiple processors. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches including, but not limited to, CPU caches used by the processor 203, page caches used by the operating system 217, disk caches of a hard drive, and/or database caches used to cache content from data store 221. For embodiments including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a data store 221 is cached in a separate smaller database in a memory separate from the data store, such as in RAM 205 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of devices, systems, and methods described herein, such as faster response times and less dependence on network conditions when transmitting and receiving data.

Although various components of computing device 200 are described separately, functionality of the various components can be combined and/or performed by a single component and/or multiple computing devices in communication without departing from the invention.

Figure 3:
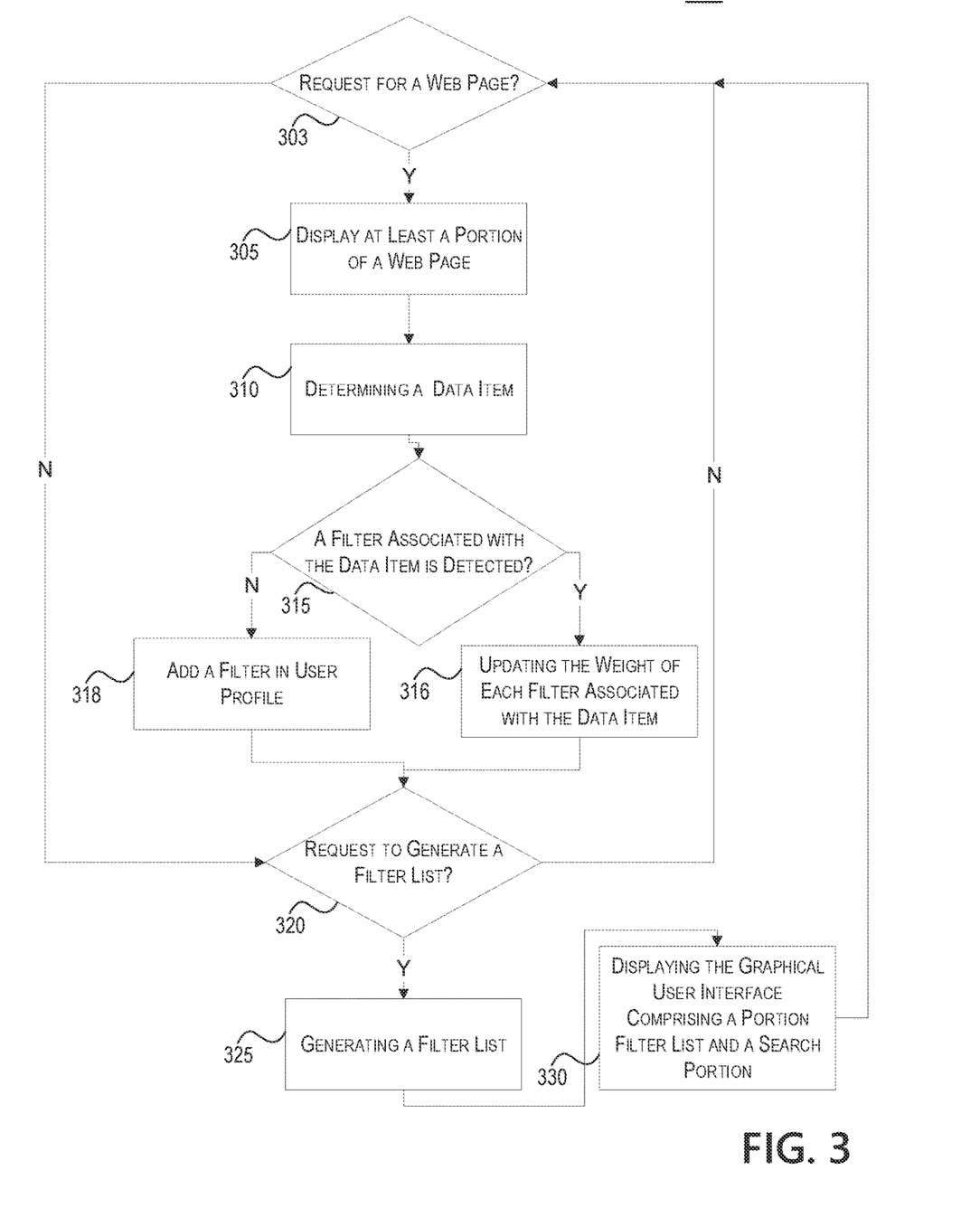
FIG. 3 depicts a flow diagram of an example method for generating filter lists in accordance with one or more illustrative aspects discussed herein.

FIG. 3 depicts a flow diagram of an example method 300 for generating filter lists. Some or all of the steps of method 300 may be performed using one or more computing devices as described herein, including, for example, computing device 200, or computing devices in FIG. 1. One or more steps of the method may be rearranged, omitted, and/or otherwise modified, and/or other steps may be added as appropriate.

At step 303, a determination may be made as to whether a request for a web page is received. For example, the determination may be made by the client device 110 in FIG. 1 based on a user's input command. If a request for a web page is received, the request may be forwarded, for example, from the client device 110 via the network 140 to the processing server system 130. The processing server system 130 may obtain the web page, for example, from the data store server system 120, and send the web page to the client device 110.

At step 305, at least a portion of the web page may be displayed in a web browser, such as a web browser on the client device 110. Depending on how much content is included in the web page and the size of the web browser, either the entire web page or a portion of the web page may be displayed.

Figure 5A:
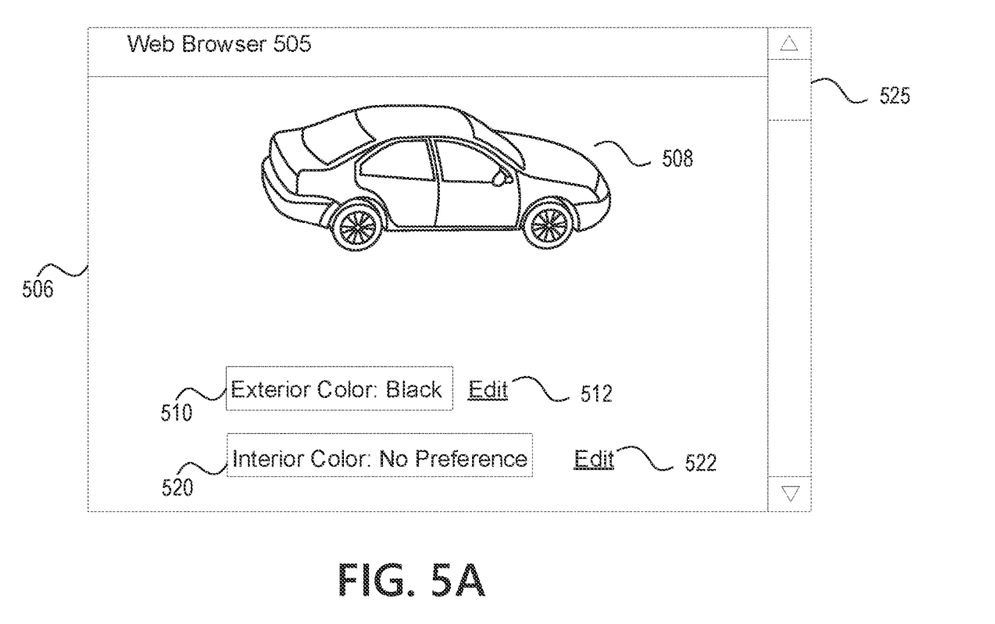
FIG. 5A and FIG. 5B depict an example of web pages in accordance with one or more illustrative aspects discussed herein.
Figure 5B:
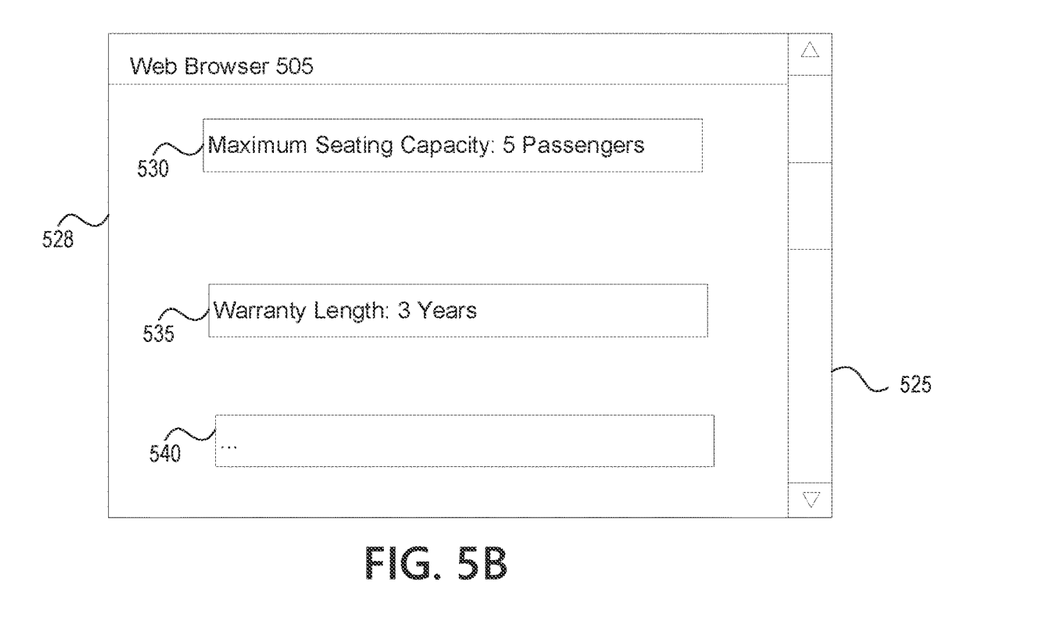

FIGS. 5A-5B show examples of a web page being displayed. For example, the web browser 505 may display a web page on a car sale website. In particular, the web page may display introduction information regarding a certain model of a car. In FIG. 5A, the web browser 505 may show a picture 508 of the car and two data items 510 and 520, each data item being associated with a feature of the car. Data item 510 may be associated, for example, with the feature "exterior color of the car." An "Edit" button 512 may be next to data item 510. If the user clicks the "Edit" button 512, a selection list may be expanded and may display multiple choices regarding the available colors of this model of the car. For example, this model may have cars with an exterior color of either blue, red, or black, and therefore the selection list may comprise blue, red, and black. The user may choose the desired color. In the depicted example, the user chose "black," but other choices are possible. Based on the choice the user made, picture 508 may show a car with a corresponding color. If the choice is changed, the color of the picture may be changed, or the price of the car (which may also be depicted) may be adjusted. Similarly, data item 520 may be associated with the feature "interior color of the car." For example, if the user has never clicked the "Edit" button 522 or otherwise indicated his interior color preference, then a "No Preference" may be shown in data item 520. Picture 508 and data items 510 and 520 may be only a portion of the web page. There may be a scroll bar 525 on the right side of the web browser 505. The user may scroll up and down to adjust which portion of the web page he wants to view. Currently as shown in FIG. 5A, only a top portion 506 of the web page may be displayed.

FIG. 5B shows the web browser 505 displaying a second portion 528 of the web page after the user scrolls the scroll bar 525 down. The second portion 528 of the web page may show other data items such as a data item 530, 535, or 540. Data item 530 may be associated with the feature "maximum seating capacity of a car." For example, the maximum seating capacity of this car may be 5 passengers. Data item 535 may be associated with the feature "warranty length of a car." For example, the warranty length of this car may be 3 years. The second portion 528 of the web page may also display one or more other data item 540. The web page may comprise other portions. For example, if the user scrolls the scroll bar 525 further down, then other portions with additional information regarding this car may be displayed.

Turning back to FIG. 3, at step 310, at least one data item in the displayed portion of the web page may be determined, wherein each of the at least one data item may correspond to a feature of a product. For example, the data item may be one or more of data item 510, 520, 530, 535, or 540 in FIGS. 5A-5B. A data item may be determined based on a determination that the user may be interested in the feature that the data item is associated with. The user's interest may be detected based on the user's behavior when viewing the web page. For example, the web page in FIGS. 5A-5B may comprise data items associated with tens or hundreds of features of a car, and if the user directly scrolls down to the second portion 528 of the web page, then a determination that the user may be interested in the maximum seating capacity feature may be made. Additional examples of how to determine the data items will be discussed in more detail with respect to FIG. 4.

Figure 6:
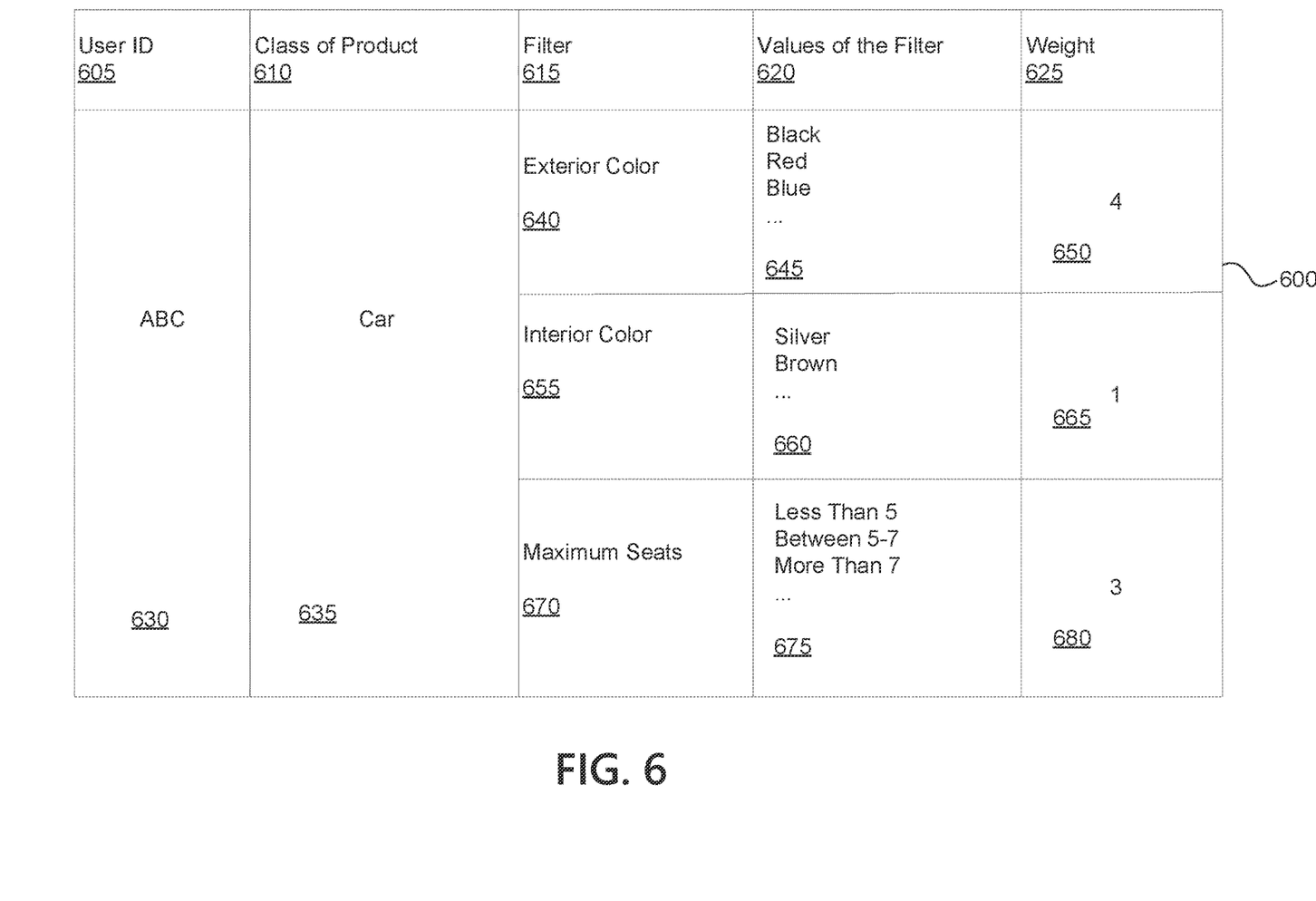
FIG. 6 depicts an example of a user profile that stores information regarding one or more filters in accordance with one or more illustrative aspects discussed herein.

At step 315, a determination may be made as to whether a filter that is associated with the determined data item is detected. If a filter is detected, then the method may proceed to step 316. If a filter is not detected, then the method may proceed to step 318. For example, a user profile may be stored and comprise information regarding multiple filters. A filter may comprise a plurality of values associated with the corresponding data item and a weight. The filters may be used to generate a filter list to help the user refining searching results during the process of a search. For example, FIG. 6 depicts an example of a user profile 600. In the example shown in FIG. 6, the user profile 600 has five columns, but any number of columns may be used. The first column 605 may be the user ID. The user ID may be assigned when the user registers an account associated with the web page, for example, a car dealing website that provides the web page, and/or assigned based on the address of the client device 110. The second column 610 may be the class of the product. Different classes of the product may have different filters. For example, if the class is cars, then filters may comprise exterior color, interior colors, maximum seats, etc. However, if the class is clothes, then filters may comprise sizes, materials, etc. In the depicted example, the class of product is cars, but other options are possible. The third column 615 may be the indication of filters. In the depicted example, three filters, exterior color filter 640, interior color filter 655, and maximum seats filter 670 are shown, but others are possible. The fourth column 620 may be a plurality of values associated with each filter. In the depicted example, the exterior color filter 640 may comprise three values, black, red, and blue, but other values are possible. Interior color filter 655 may comprise two values, silver and brown, but other values are possible. Maximum seat filter 670 may comprise three values, less than 5, between 5-7, and more than 7, but other values are possible.

The fifth column 625 may be the weight of each filter. The weight may be used to order the filters when a filter list is generated. For example, a filter with a greater weight may be ordered higher in a filter list and displayed in a more significant location that may be more likely to attract the user's attention. For example, a filter having the greatest weight may be ordered the highest, and a filter having the second greatest weight may be ordered the second-highest. A default weight of each filter may be assigned prior to any information regarding the user is obtained. For example, a default weight may be assigned manually based on a network administrator's preference. For example, a default weight may be assigned based on a cohort of users that have viewed the web page. For example, a default weight may be assigned based on an average weight of this filter among all users in the user profile. For example, a default weight may be assigned equally to each filter. If more than one filters have the same weight, alphabetical order may be used if a filter list is generated.

At step 316, the weight of the filter may be updated based on the data items determined at step 310. For example, if it is determined that the user may be interested in data item 510, e.g., the exterior color of the car, then more weight may be assigned to the exterior color filter 640.

At step 318, a new filter may be added, for example, in the user profile 600. For example, the data item determined at step 310 may be data item 535 in FIG. 5B. Since the user profile 600 may not have a filter associated with warranty length, then such a filter may be generated and added into the user profile 600. A default weight may be assigned similar to what may be discussed above. A plurality of values associated with the data items may be generated. For example, the plurality of values may be created by a network administrator manually, or may be found from other user profiles or databases that have already comprised the filter.

At step 320, a determination may be made as to whether a request to generate a filter list is received. For example, if the user requests to open another web page to search for cars, then the processing server system 130 may determine a filter list should be generated and then displayed to the user, so that the user could use the filter list to refine his search. For example, the user may use the exterior color filter 640 and select the value "black" to eliminate search results that comprise a car of a color other than black.

If a request to generate a filter list is received, the method may proceed to step 325. At step 325, a filter list may be generated. The filter list may comprise one or more filters of a class associated with the product. The one or more filters may be automatically ordered on the filter list based on the weight of each filter. For example, based on the weight of each filter in user profile 600, a filter list may order the exterior color filter 640 higher than other filters since, in this example the exterior color filter 640 has the highest weight. The filter list may order the maximum seats filter 670 the second-highest since, in this example, the maximum seats filter 670 has the second-highest weight. The filter list may order the interior color filter 655 lower than others since, in this example, the interior color filter 655 has the lowest weight.

At step 330, a graphical user interface may be generated and displayed. The graphical user interface may comprise the filter list generated at step 325, and a search page comprising a plurality of search results corresponding to the class associated with the product. The search results may be determined based on at least one filter on the filter list. The graphical user interface may be displayed using the web browser.

For example, the display characteristics of a computing device executing the web browser may be determined. A filter area and a content area of the graphical user interface based on the display characteristics may be determined. The display of the filter list within the graphical user interface may be formatted based on the filter area, and the display of the search page within the graphical user interface may be formatted based on the content area. For example, the display characteristics may comprise the size and the resolution of the graphical user interface. For example, the graphical user interface on a mobile device may be different from the graphical user interface displayed on a laptop, since the mobile device may have a smaller screen and therefore should contain less information in order to prevent the displayed information from being obscured. For example, each filter on the filter list displayed on a laptop may be expanded to display different options (e.g., an expanded selection list comprising the option of black, blue, and red), while each filter on the filter list displayed on a mobile device may not be expanded without the user's input instruction. A portion of the filters on the filter list to be displayed in the filter area may be selected based on the weight associated with each of the filters on the filter list. For example, if it is determined that due to the limited space of the web page, only some of the filters may be displayed. A plurality of filters that are ordered the highest may be selected and displayed. Another plurality of filters that are ordered the lowest may not be selected and displayed.

Figure 7:
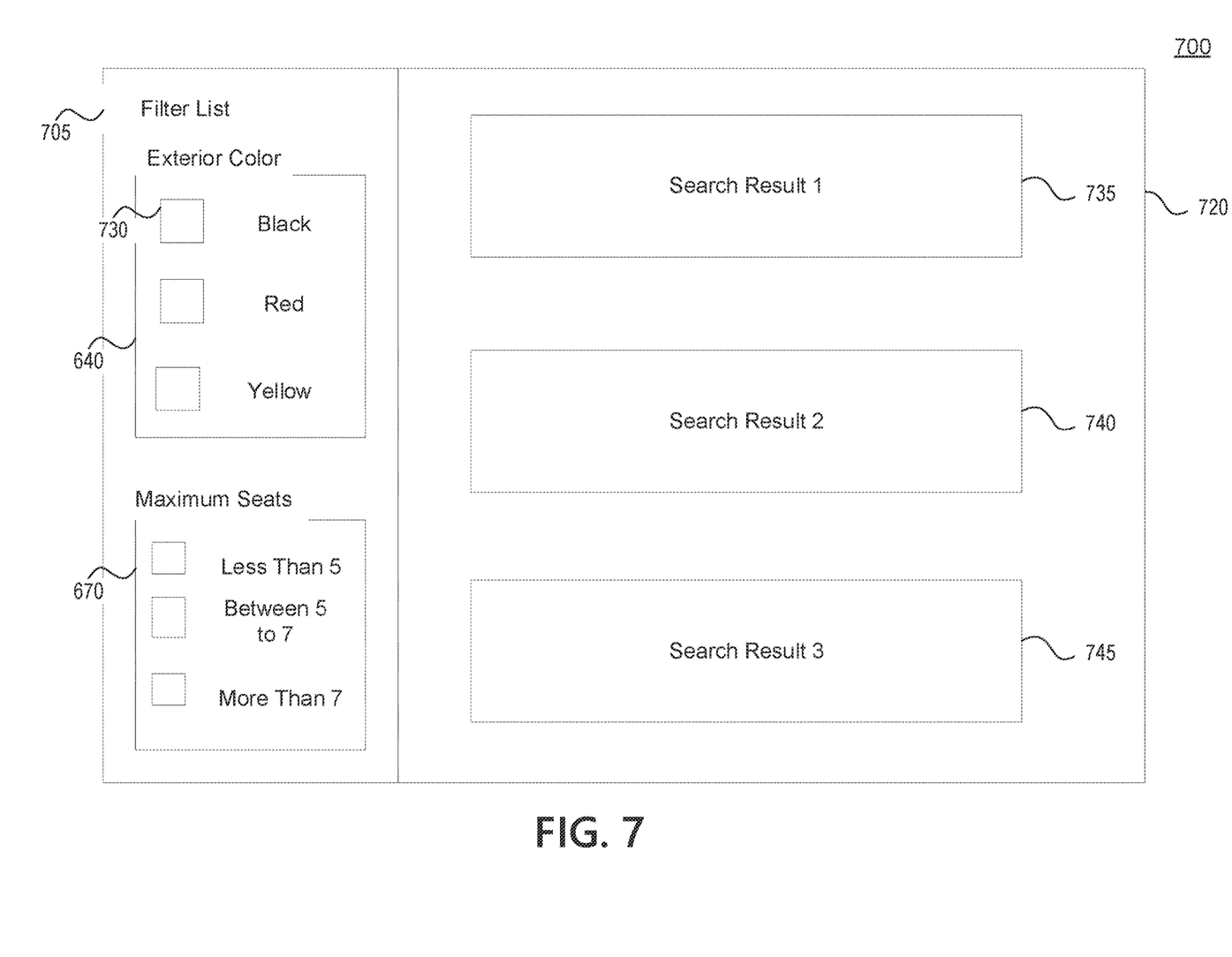
FIG. 7 depicts an example of a graphical user interface displayed to a user in accordance with one or more illustrative aspects discussed herein.

FIG. 7 shows an example of a graphical user interface 700. The graphical user interface 700 may be displayed in the web browser 505 on client device 110. On the left side, a filter list 705 may be displayed. The filter list 705 may be generated based on user profile 600, and comprise multiple filters. For example, such as may be depicted, there may be three filters. For example, consistent with the particular example described in FIG. 6, the exterior color filter 640 may be ordered highest, the maximum seats filter 670 may be ordered the second-highest, and the interior color filter 655 may be ordered the lowest. Other orderings or numbers of filters are possible. Due to the size of the graphical user interface 700, it may not have enough space to display all three filters and therefore only the top two of the three filters may be displayed. As discussed herein, the filter that is ordered the highest may be displayed in the most significant location that may be most likely to attract the user's attention. For example, such as may be depicted in FIG. 7, the filter list 705 may be shown at the left sidebar of the graphical user interface 700, and the most significant location may be the top portion of the left sidebar.

The right side may display the search page 720, which may show search results. Search page 720 may show multiple results, e.g., search result 1 735, search result 2 740, and search result 3 745. For example, prior to displaying this graphical user interface 700, the user may be shown another webpage, which may display a dialog box that allows the user to search the type of cars the user wanted to search for. The user may type "used cars of brand A," and press the "enter" button. The search results 735, 740, and, 745 may all be results that satisfy the user's typed condition "used cars of brand A."

The user may then use the filter list 705 to refine the search results. For example, if the user only wants to see only black cars, then the user may click checkbox 730 that is next to the text "Black." Then, based on a determination that the user checked checkbox 730, the search page 720 may be updated. For example, search result 735 may be associated with a black car. Search results 740 and 745 may be associated with cars of another color. The updated search page may no longer comprise search results 740 and 745. Other search results that are associated with black cars and are not previously displayed in the graphical user interface 700 (e.g., search results that are comprised in other portions of the web page and not displayed due to the limited screen size) may be displayed, since deleting search results 740 and 745 may provide extra space to display other search results. In this way, by ordering filters based on the user's interest, it may be convenient for the user to see the filters that he cares about most (e.g., exterior colors) and refine his search results easier. Without automatically ordering the filter list based on the user's interest, a default filter list (e.g., based on either the network administrator's preference or based on the preference of other users) may not order the filter that the user cares about most at the most significant location. For example, the exterior color filter 640 may be displayed in other portions of the web page. Then, the user may not know there is such a filter and may need to see search results that he does not care about. Or, the user may need to take time and scroll down through the web page to find the filter 640. Either not being able to use the filter he cares about or spending time to find the filter reduces the level of satisfaction of the user.

Turning back to FIG. 3, after step 330 (e.g., after displaying the graphical user interface 700), the system may return to step 303. If a new request for another web page may be made by the user, then new data items may be determined and the weight of the filters that are associated with the determined data items may be updated. A new filter list may be generated based on the steps described above. In this way, the more web pages the user views, the more accurate weights that reflect the user's interest may be adjusted. A filter list that may fit the user's interest better may be provided.

Figure 4:
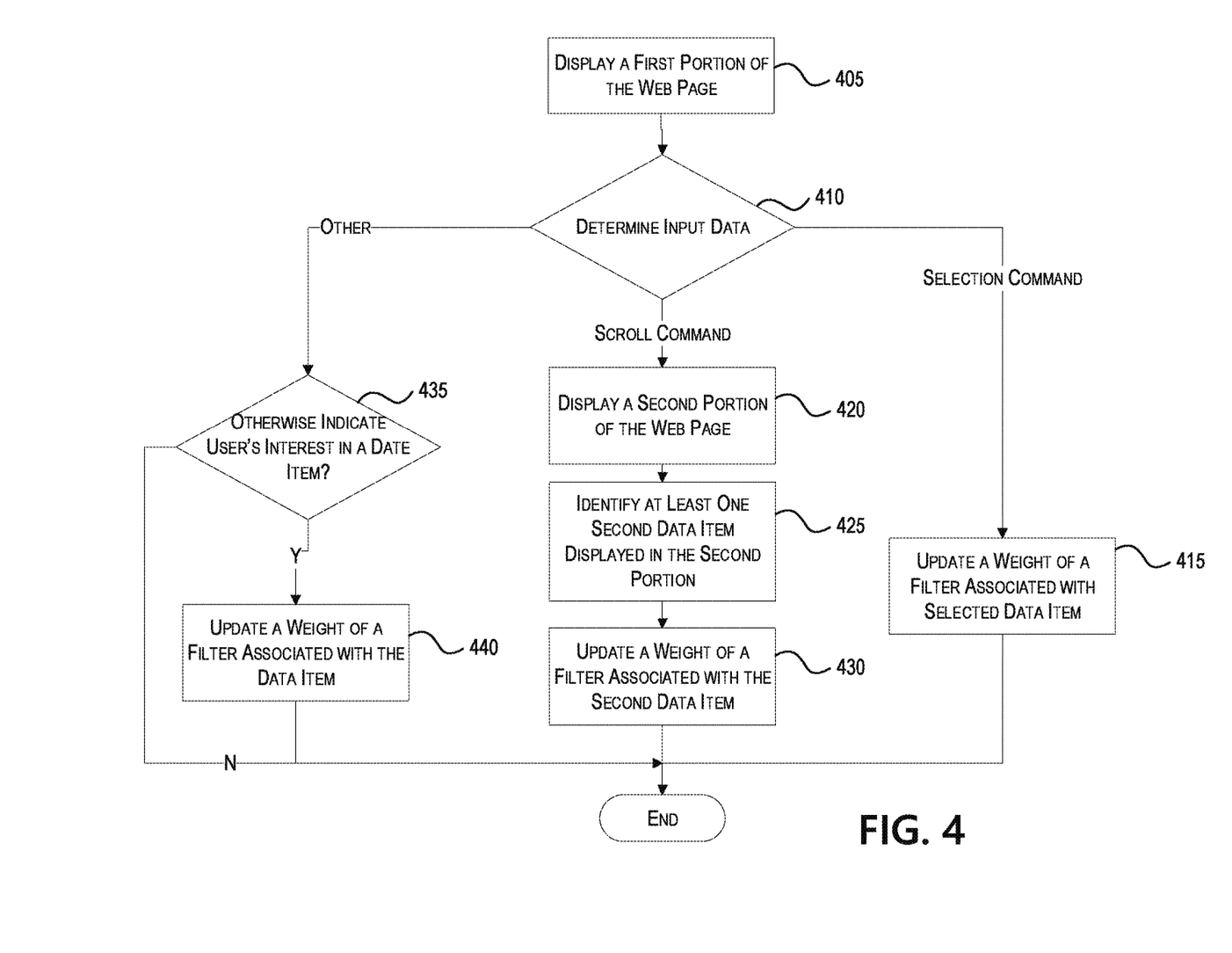
FIG. 4 depicts a flow diagram of an example method for updating the weight of one or more filters in a filter list in accordance with one or more illustrative aspects discussed herein.

FIG. 4 depicts a flow diagram of an example method for updating the weight of one or more filters in a filter list in accordance with one or more illustrative aspects discussed herein. For example, FIG. 4 may be used for updating the weight of a filter depicted in FIG. 3. Some or all of the steps of the method in FIG. 4 may be performed using one or more computing devices as described herein, including, for example, computing device 200, or computing devices in FIG. 1. One or more steps of the example, the method may be rearranged, omitted, and/or otherwise modified, and/or other steps may be added as appropriate.

At step 405, a first portion of a web page may be displayed. The web page may be a web page obtained by client device 110 and displayed on a web browser 505. For example, the web page may be the same as the web page discussed above in FIG. 3. For example, the web page may be the web page depicted in FIGS. 5A-5B.

At step 410, input data from the user may be received, for example, from an input device associated with the client device 110. For example, the input device may be a mouse or a keyboard associated with the client device 110. The type of the input data may be determined, for example, by the client device 110.

If it is determined that the input data comprises a selection command, step 415 may be performed. For example, the input data may comprise clicking the "Edit" button 512 in FIG. 5A. For example, such as may be discussed above, the "Edit" button 512 may correspond to data item 510, which may be associated with the feature "exterior color of a car." If the user clicks on the "Edit" button 512, it may indicate the user is interested in that feature. For example, the weight of the exterior color filter 640 may be updated based on the selection.

If it is determined that the input data comprises a scroll command, step 420 may be performed. For example, the input data may comprise scrolling down the scroll bar 525 on the web browser 505 in FIG. 5A. At step 420, a second portion 528 of the web page may be displayed. For example, the second portion 528 may be displayed as is shown in FIG. 5B.

At step 425, at least one second data item displayed in the second portion of the web page may be identified. For example, after a first portion, for example, a top portion 506 is displayed, the user may scroll down the scroll bar 525 and may quickly pass through numerous data items, and then, may pause at the second portion 528 and stay there for a certain time duration. This may indicate that the user is interested in at least one of data items 530, 535, or 540. One or more of the data items 530, 535, and 540 may be identified. In some examples, all of the data items displayed in the second portion 528 may be identified. In other examples, some of the data items (for example, a certain number of data items displayed in the central area of the second portion 528 (e.g., data item 535)) may be identified.

At step 430, the weight of at least one filter may be updated. Each of the at least one filter may be associated with a second data item identified at step 425. In some examples, the filter associated with a data item may be determined by identifying a token in the displayed portion of the web page, wherein the token comprises a semantic tag. For example, the web page may be a Hypertext Markup Language (HTML) document. The token may comprise the programming code of a tracking pixel. Each tracking pixel may comprise a semantic tag that is associated with the filter corresponding to the data item. The tracking pixel may fire (e.g., send a message to the processing server system 130) if certain user behavior associated with the data item (e.g., the user's clicking or viewing the data item) is detected. For example, consistent with the example in FIG. 5B, the semantic tag associated with data item 535 may comprise "Warranty Length." If the user scrolls down the web page and the data item 535 is viewed, the tracking pixel may send a message that indicates a data item associated with warranty length is viewed.

In other examples, the filter associated with a data item may be determined by parsing an Application Programming Interface (API) request sent from the client device 110. Or, the filter associated with a data item may be determined by identifying a hierarchy level of the web page in the website hierarchy structure. It will be appreciated that various ways to determine the filters are contemplated herein and will become apparent to a person having ordinary skill in the art with the benefit of this disclosure.

The weight of data items 530, 535, or 540 may be updated in the user profile 600. For example, the weight of each one of the at least one second data item may be increased equally. Or, the weight of each one of the at least one second data item may be increased differently. For example, in FIG. 5B, it may be determined that data item 535 is displayed in the center of the web browser 505, while data item 530 is displayed at the very top of the web browser 505. It may be inferred that the user's focus is on the center of the web browser 505, and therefore, by scrolling the scroll bar 525 down and pausing it at the current location as is shown in FIG. 5B, the user is more likely to be reading data item 535, instead of data item 530. Therefore, the weight of the filter associated with data item 535 may be increased more than the weight of the filter associated with data item 530. How much weight to be increased may also be determined based on other factors. For example, the weight of each filter may be adjusted based on the time the user spends on the corresponding data item.

If it is determined that input data other than a selection command or scroll command is received, then step 435 may be performed. At step 435, a determination may be made as to whether the input data otherwise indicates the user's interest in a data item that is associated with the input data. For example, the input data may be a zoom-in command. If a data item is zoomed in, it may indicate the user is interested in the feature associated with the data item. For another example, the input data may be moving a mouse cursor pointing to a data item without clicking or selecting. It may indicate that the user is reading the data item and therefore may be interested in the feature associated with the data item. For another example, the input data may be a webcam input. Based on the visual data the webcam provides, it may be determined that the user's gaze is focusing on a data item. For another example, the input data may be an audio input received by a microphone. Based on the audio input, it may be determined that the user is reading the data item, and therefore may be interested in the feature associated with the data item.

If it is determined that the input data indicates the user's interest in at least one data item, the method may proceed to step 440. At step 440, the weight of the filter associated with the data item may be updated. The weight may be updated as discussed herein.

Although the present disclosure has been described in terms of various examples, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner. Thus, the present disclosure should be considered in all respects as illustrative and not restrictive. Accordingly, the scope of the disclosure should be determined not by the examples, but by the appended claims and their equivalents.

What is claimed is:

1. A computer-implemented method comprising:
obtaining a web page being viewed in a web browser, wherein the web browser displays a portion of the web page;
determining at least one data item of a first set of data items in the displayed portion of the web page, wherein each of the at least one data item corresponds to a feature of a product;
determining at least one filter corresponding to the at least one data item, wherein the at least one filter comprises a plurality of values associated with the corresponding data item and a weight;
generating a filter list for a class associated with the product by automatically ordering the filter list based on the weight of each filter on the filter list, wherein the filter list comprises the at least one filter;
generating a graphical user interface comprising the filter list and a search page comprising a plurality of search results corresponding to the class associated with the product, wherein the search results are determined based on the at least one filter on the filter list;
displaying the graphical user interface using the web browser;
obtaining input data to scroll through the web page;
displaying a second portion of the web page using the web browser;
identifying at least one second data item of a first set of data items in the second portion of the web page displayed using the web browser;
determining at least one additional filter based on the input data;
updating the weight of the at least one additional filter based on the input data and the display of the at least one second data item within the second portion of the web page; and
generating a second filter list to include the at least one additional filter corresponding to the at least one second data item.

2. The computer-implemented method of claim 1, further comprising:
obtaining selection input data indicating a selected data item displayed on the web page; and
updating the weight of the filter associated with the selected data item indicated in the input data.

3. The computer-implemented method of claim 1, further comprising determining a filter in the at least one filter by:
identifying a token in the displayed portion of the web page, wherein the token comprises a semantic tag;
determining the token corresponds to a data item for a feature of the product; and
selecting the filter corresponding to the data item associated with the token.

4. The computer-implemented method of claim 1, further comprising:
determining display characteristics of a computing device executing the web browser;
determining a filter area and a content area of the graphical user interface based on the display characteristics;
formatting display of the filter list within the graphical user interface based on the filter area; and
formatting display of the search page within the graphical user interface based on the content area.

5. The computer-implemented method of claim 4, further comprising selecting a portion of the at least one filter on the filter list to be displayed in the filter area based on the weight associated with each of the filters on the filter list.

6. The computer-implemented method of claim 1, further comprising:
storing an indication of the at least one filter using a user profile;
obtaining a second web page comprising information related to the class associated with the product;
determining a second set of data items displayed on the second web page;
generating a third set of filters based on the second set of data items;
updating the weights of the filters in the third set of filters;
generating a third filter list based on the updated weights of the filters in the third set of filters;
generating a second graphical user interface comprising the third filter list and a second search page comprising a plurality of search results corresponding to the class associated with the product; and
displaying the second graphical user interface using the web browser.

7. The computer-implemented method of claim 1, further comprising:
obtaining, for each data item, a default weight associated with the data item, the default weight generated based on a cohort of users that have viewed the web page; and
updating the weight for each filter associated with each data item based on the default weight for the data item.

8. An apparatus, comprising:
one or more processors; and
memory storing instructions that, when executed by the one or more processors, cause the apparatus to:
obtain a web page being viewed in a web browser, wherein the web browser displays a portion of the web page;
determine at least one data item of a first set of data items in the displayed portion of the web page, wherein each of the at least one data item corresponds to a feature of a product;
determine at least one filter corresponding to the at least one data item, wherein the at least one filter comprises a plurality of values associated with the corresponding data item and a weight;
generate a filter list for a class associated with the product by automatically ordering the filter list based on the weight of each filter on the filter list, wherein the filter list comprises the at least one filter;
generate a graphical user interface comprising the filter list and a search page comprising a plurality of search results corresponding to the class associated with the product, wherein the search results are determined based on the at least one filter on the filter list;
display the graphical user interface using the web browser;
obtain input data to scroll through the web page;
display a second portion of the web page using the web browser;
identify at least one second data item in the second portion of the web page displayed using the web browser; and
generate a third filter list to include at least one additional filter corresponding to the at least one second data item.

9. The apparatus of claim 8, wherein the instructions, when executed by the one or more processors, cause the apparatus to:
obtain selection input data indicating a selected data item displayed on the web page; and
update the weight of the filter associated with the selected data item indicated in the input data.

10. The apparatus of claim 8, wherein the instructions, when executed by the one or more processors, cause the apparatus to update the weight of the at least one additional filter based on the input data.

11. The apparatus of claim 8, wherein the instructions, when executed by the one or more processors, cause the apparatus to:
determine display characteristics of the apparatus;
determine a filter area and a content area based on the display characteristics;
format displaying of the filter list based on the filter area; and format displaying of the search page based on the content area.

12. The apparatus of claim 11, wherein the instructions, when executed by the one or more processors, cause the apparatus to select a portion of the filters on the filter list to be displayed in the filter area based on the weight associated with each of the filters on the filter list.

13. The apparatus of claim 8, wherein the instructions, when executed by the one or more processors, cause the apparatus to:
obtain, for each data item, a default weight associated with the data item, the default weight generated based on a cohort of users that have viewed the web page; and
update the weight for each filter associated with each data item based on the default weight for the data item.

14. The apparatus of claim 8, wherein the instructions, when executed by the one or more processors, cause the apparatus to:
store an indication of the at least one filter using a user profile;
obtain a second web page comprising information related to the class associated with the product;
determine a second set of data items displayed on the second web page;
generate a third set of filters based on the second set of data items;
update the weights of the filters in the third set of filters;
generate a third filter list based on the updated weights of the filters in the third set of filters;
generate a second graphical user interface comprising the third filter list and a second search page comprising a plurality of search results corresponding to the class associated with the product; and
display the second graphical user interface using the web browser.

15. A non-transitory machine-readable medium storing instructions that, when executed by one or more processors, cause the one or more processors to perform steps comprising:
obtaining a web page being viewed in a web browser, wherein the web browser displays a portion of the web page;
determining at least one data item of a first set of data items in the displayed portion of the web page, wherein each of the at least one data item corresponds to a feature of a product;
determining at least one filter corresponding to the at least one data item, wherein the at least one filter comprises a plurality of values associated with the corresponding data item and a weight;
generating a filter list for a class associated with the product by automatically ordering the filter list based on the weight of each filter on the filter list, wherein the filter list comprises the at least one filter;
determining display characteristics of the web browser;
determining a filter area and a content area based on the display characteristics;
generating a graphical user interface comprising the filter list and a search page comprising a plurality of search results corresponding to the class associated with the product, wherein the search results are determined based on the at least one filter on the filter list;
formatting the displaying of the filter list based on the filter area;
formatting the displaying of the search page based on the content area;
displaying the graphical user interface using the web browser;
obtaining input data to scroll through the web page;
displaying a second portion of the web page using the web browser;
identifying at least one second data item of a first set of data items in the second portion of the web page displayed using the web browser;
determining at least one additional filter based on the input data;
updating the weight of the at least one additional filter based on the input data and the display of the at least one second data item within the second portion of the web page; and
generating a second filter list to include the at least one additional filter corresponding to the at least one second data item.

16. The non-transitory machine-readable medium of claim 15, wherein the instructions, when executed by the one or more processors, cause the one or more processors to perform steps comprising:
obtaining selection input data indicating a selected data item displayed on the web page; and
updating the weight of the filter associated with the selected data item indicated in the input data.

17. The non-transitory machine-readable medium of claim 15, wherein the instructions, when executed by the one or more processors, cause the one or more processors to perform steps comprising selecting a portion of the at least one filter on the filter list to be displayed in the filter area based on the weight associated with each of the filters on the filter list.

18. The non-transitory machine-readable medium of claim 15, wherein the instructions, when executed by the one or more processors, cause the one or more processors to perform steps comprising:
obtaining, for each data item, a default weight associated with the data item, the default weight generated based on a cohort of users that have viewed the web page; and
updating the weight for each filter associated with each data item based on the default weight for the data item.

19. The non-transitory machine-readable medium of claim 15, wherein the instructions, when executed by the one or more processors, cause the one or more processors to perform the steps comprising:
storing an indication of the at least one filter using a user profile;
obtaining a second web page comprising information related to the class associated with the product;
determining a second set of data items displayed on the second web page;
generating a third set of filters based on the second set of data items;
updating the weights of the filters in the third set of filters;
generating a third filter list based on the updated weights of the filters in the third set of filters;
generating a second graphical user interface comprising the filter list and a second search page comprising a plurality of search results corresponding to the class associated with the product; and
displaying the second graphical user interface using the web browser.

* * * * *